(12) United States Patent
Patro et al.

(10) Patent No.: US 8,488,757 B1
(45) Date of Patent: Jul. 16, 2013

(54) SYSTEM, METHOD, AND COMPUTER PROGRAM PRODUCT FOR DETERMINING A RECOMMENDED DEVICE FROM A PLURALITY OF DEVICES FOR INITIATING A PHONE CALL

(75) Inventors: Debabrata Patro, Pune (IN); Menachem Domb, Ramat Gan (IL)

(73) Assignee: Amdocs Software Systems Limited, Dublin (IE)

( * ) Notice: Subject to any disclaimer, the term of this patent is extended or adjusted under 35 U.S.C. 154(b) by 1084 days.

(21) Appl. No.: 12/473,942

(22) Filed: May 28, 2009

(51) Int. Cl.
*H04M 15/00* (2006.01)
(52) U.S. Cl.
USPC .................................. 379/114.02; 379/127.05
(58) Field of Classification Search
USPC ............. 379/114.02, 114.03, 114.21, 127.05, 379/221.01, 221.02
See application file for complete search history.

(56) References Cited

U.S. PATENT DOCUMENTS

| | | | | |
|---|---|---|---|---|
| 5,915,214 | A  * | 6/1999 | Reece et al. | 455/406 |
| 7,158,620 | B2 * | 1/2007 | Kobrosly et al. | 379/114.02 |
| 2004/0151293 | A1 * | 8/2004 | Jensen et al. | 379/114.02 |
| 2007/0037550 | A1 | 2/2007 | Rassam | 455/406 |
| 2009/0086945 | A1 * | 4/2009 | Buchanan et al. | 379/201.02 |

* cited by examiner

*Primary Examiner* — Quoc D Tran
(74) *Attorney, Agent, or Firm* — Zilka-Kotab, PC (57) ABSTRACT

A system, method, and computer program product are provided for determining at least one recommended device from a plurality of devices for initiating a phone call based on a determined call rate. In operation, information associated with an attempted phone call is received. Additionally, a call rate for a plurality of devices capable of initiating the attempted phone call and/or at least one recommended long distance and/or international carriers are determined. Furthermore, at least one recommended device of the plurality of devices for initiating the phone call and/or at least one recommended long distance and/or international carrier is determined based, at least in part, on the determined call rate. The phone call is initiated utilizing one of the at least one recommend device and/or utilizing one of the at least one recommended long distance and/or international carrier.

17 Claims, 6 Drawing Sheets

SYSTEM, METHOD, AND COMPUTER PROGRAM PRODUCT FOR DETERMINING A RECOMMENDED DEVICE FROM A PLURALITY OF DEVICES FOR INITIATING A PHONE CALL

FIELD OF THE INVENTION

The present invention relates to communication systems, and more particularly to selecting a communication device for initiating a phone call from multiple devices based on a rate.

BACKGROUND

Currently, there are a large number of households and businesses that have multiple phone subscriptions with a landline phone and one or more mobile phones. These subscriptions may be with one or more service providers. Additionally, each subscription may be associated with one or more phones.

The households and businesses may have multiple subscriptions and multiple providers for many different reasons. For example, these subscriptions may be present because a certain service plan associated with a phone has a better rate for a set of services. Additionally, one subscription may be for business use and another subscription may be for personal use. Still yet, households and businesses may have call plans with one or more long distance and/or international carriers that give better rates for specific countries or for a specific time of day.

Each of the available phones and/or service providers associated with a subscription may have certain situations where their use is most efficient, relative to the other available phones or providers. Currently, a user must manually select the phone to be used for each call in order to get the best rates. There is thus a need for addressing these and/or other issues associated with the prior art.

SUMMARY

A system, method, and computer program product are provided for determining at least one recommended device from a plurality of devices for initiating a phone call based on a determined call rate. In operation, information associated with an attempted phone call is received. Additionally, a call rate for a plurality of devices capable of initiating the attempted phone call and/or at least one recommended long distance and/or international carriers are determined. Furthermore, at least one recommended device of the plurality of devices for initiating the phone call and/or at least one recommended long distance and/or international carrier is determined based, at least in part, on the determined call rate. The phone call is initiated utilizing one of the at least one recommend device and/or utilizing one of the at least one recommended long distance and/or international carrier.

DETAILED DESCRIPTION

Figure 1:
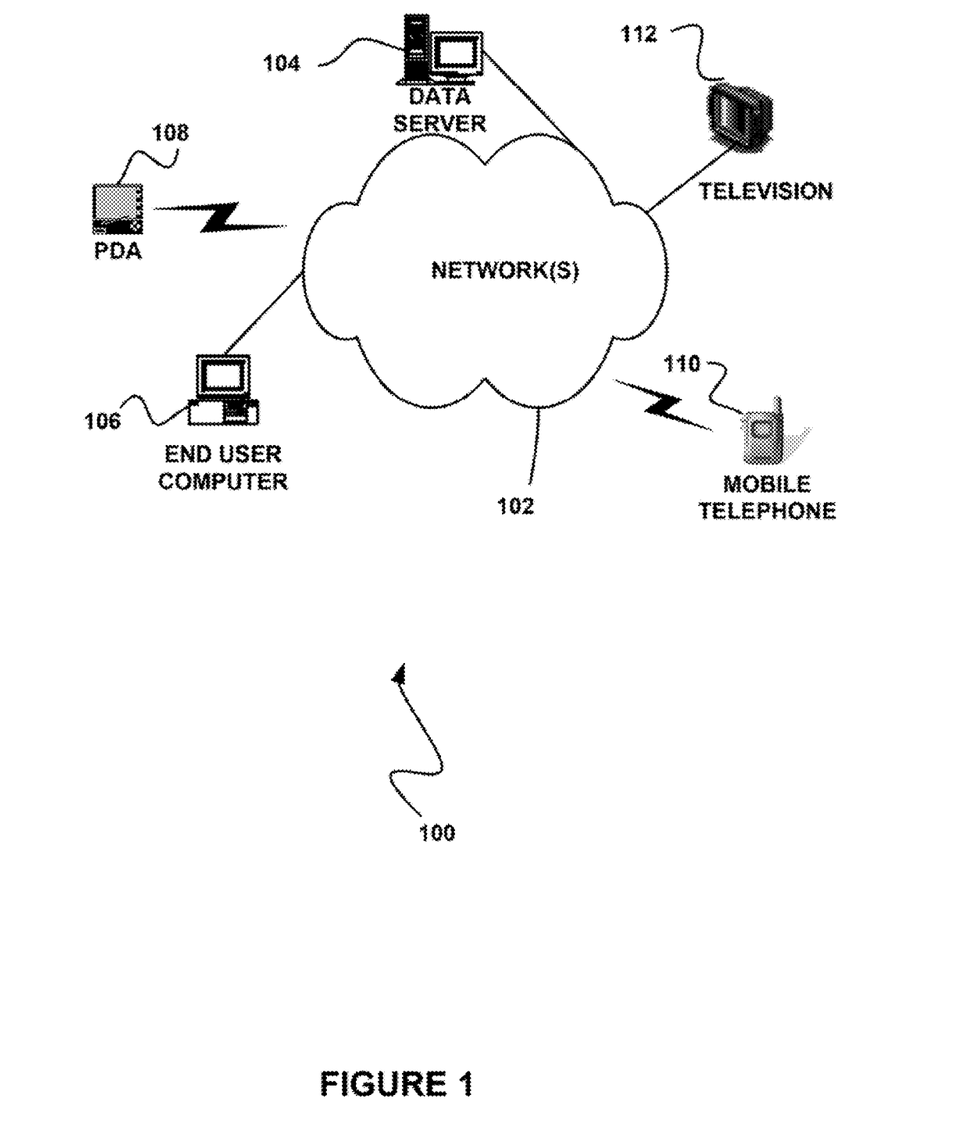
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
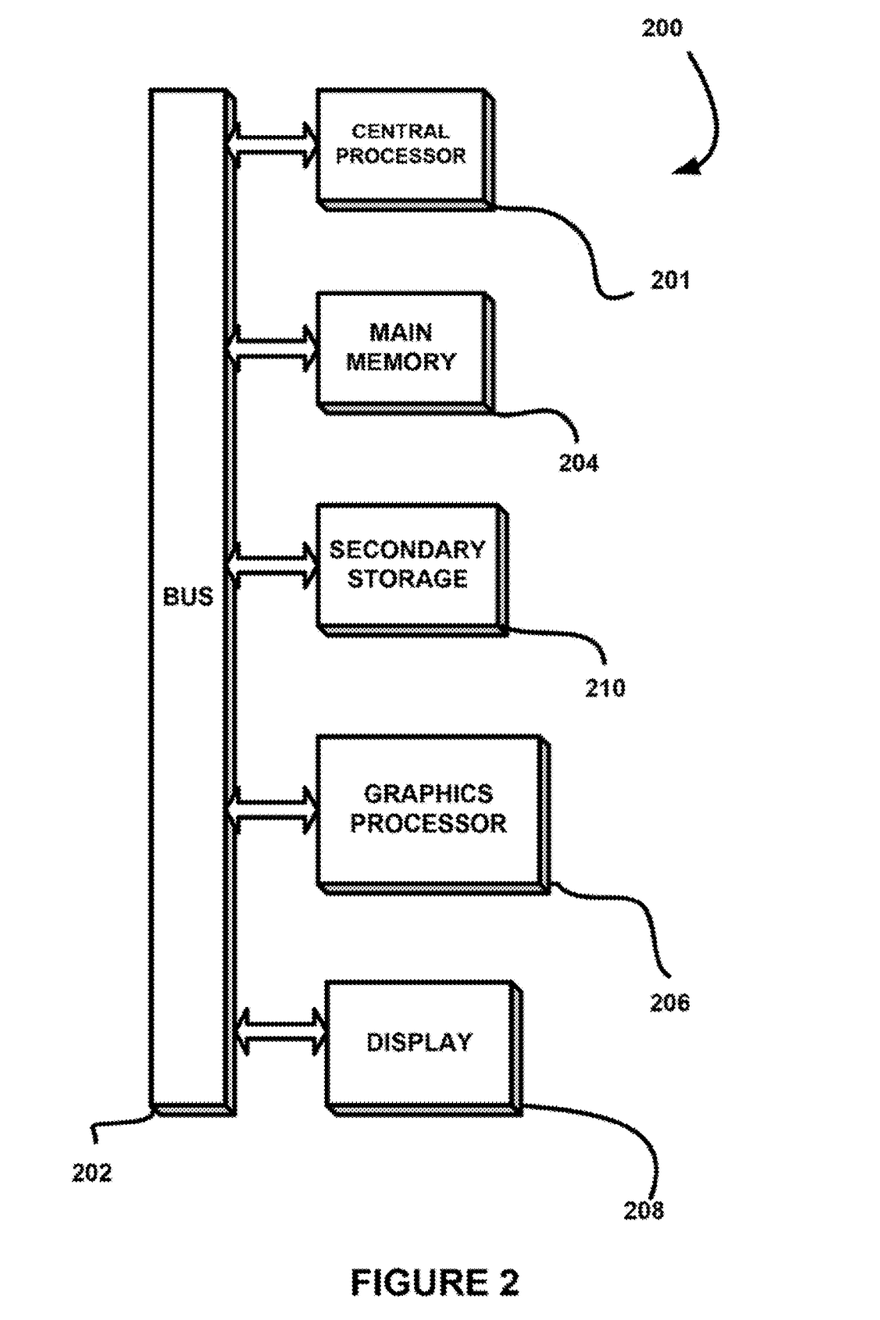
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
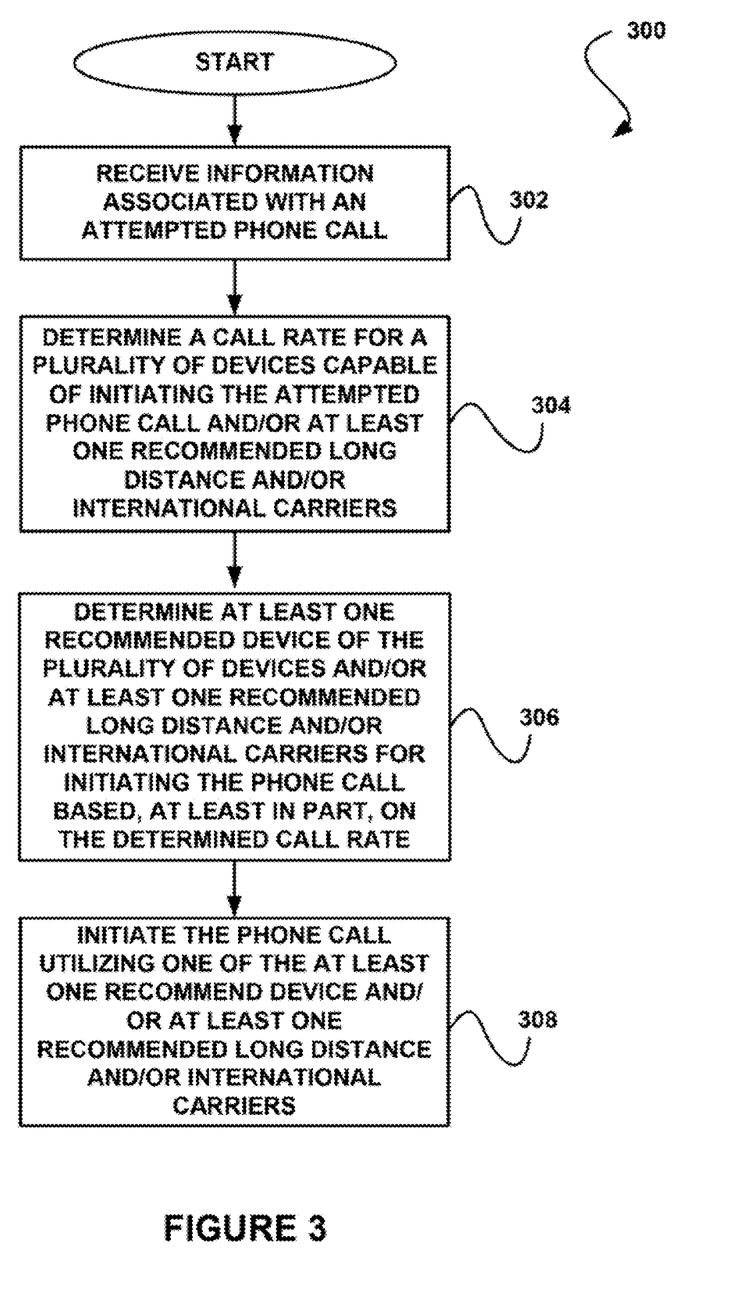
FIG. 3 shows a method for determining at least one recommended device from a plurality of devices for initiating a phone call based on a determined call rate, in accordance with one embodiment.

FIG. 3 shows a method 300 for determining at least one recommended device from a plurality of devices for initiating a phone call based on a determined call rate, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

In operation, information associated with an attempted phone call is received. See operation 302. The information associated with the attempted phone call may include any information associated with a phone call. For example, in various embodiments, the information may include at least one of a phone number associated with the attempted phone call (e.g. a dialed number, etc.), a date of the attempted phone call, a time of the attempted phone call, and a geographical location associated with the attempted phone call (e.g. a geographical location associated with an origin of the attempted call, a geographical location associated with a destination of the attempted call, etc.).

Additionally, a call rate for a plurality of devices capable of initiating the attempted phone call is determined. See operation 304. The devices may include any devices capable of initiating the attempted phone call. For example, in various embodiments, the devices may include mobile phones of a cellular network, phones using a landline, computer implemented telephony devices, and/or any other device capable of initiating the attempted phone call.

In one embodiment, one or more of the plurality of devices may be associated with a different service subscription and/or a different service provider. In this way, a group of devices, each potentially using a different phone service, may be accessed. Further, a rate plan provided by the service provider of such device may also be accessed and utilized.

Additionally, in one embodiment, the devices may represent devices of a service provider (e.g. a cellular service provider, etc.). In this case, the devices may represent different providers associated with a user. In this way, a group of service providers may be accessed.

Once the call rate is determined, at least one recommended device of the plurality of devices for initiating the phone call is determined based, at least in part, on the determined call rate. See operation 306. It should be noted that the call rate may be determined based on different criteria. In one embodiment, the call rate may be determined based on rating related information for each of the plurality of devices.

In the context of the present description, rating related information refers to any information associated with a call rate. For example, in various embodiments, rating related information may include, but is not limited to, a number of available minutes for each of the plurality of devices (e.g. a number of available free minutes, a number of available prepaid minutes, etc.), a minimum commitment associated with each of the plurality of devices (e.g. a talk time commitment, a use commitment, etc.), a rate for a type of call, a friends and family call rate, a bill cycle period associated with each of the plurality of devices, a rate for different long distance or international carriers who can provide an associated service, and/or any other rating related information that meets the above definition.

In the case that the rating related information includes a rate for the type of call, various types of calls may be considered. For example, in various embodiments, the type of call may include calls between wireless devices (e.g. mobile phones, etc.), calls between wireless devices and landline devices (e.g. phones on a landline, etc.), calls between landline devices, calls between computer telephony devices and other devices, and/or various other types of calls.

Once at least one recommended device of the plurality of devices for initiating the phone call is determined, the phone call is initiated utilizing one of the at least one recommend devices. See operation 308. In this case, one or more devices may be recommended and the phone call may be initiated using one of those devices. As noted above, the devices may be representative of service providers. In this case, one or more service providers may be recommended and the phone call may be initiated using one of those service providers.

In various embodiments, the device used to initiate the phone call may be selected from the one or more recommended devices by a user (e.g. the caller, etc.) or may be selected automatically based on a rank of the recommended devices. In the context of the present description, initiating a phone call refers to any technique of attempting to establish a communication link between an origin device and a destination device. For example, in various embodiments, initiating the phone call may include using a service associated with the device to dial a phone number, attempting to contact a call center associated with the device, dialing a phone number using the device, and/or any other technique of initiating a phone call.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
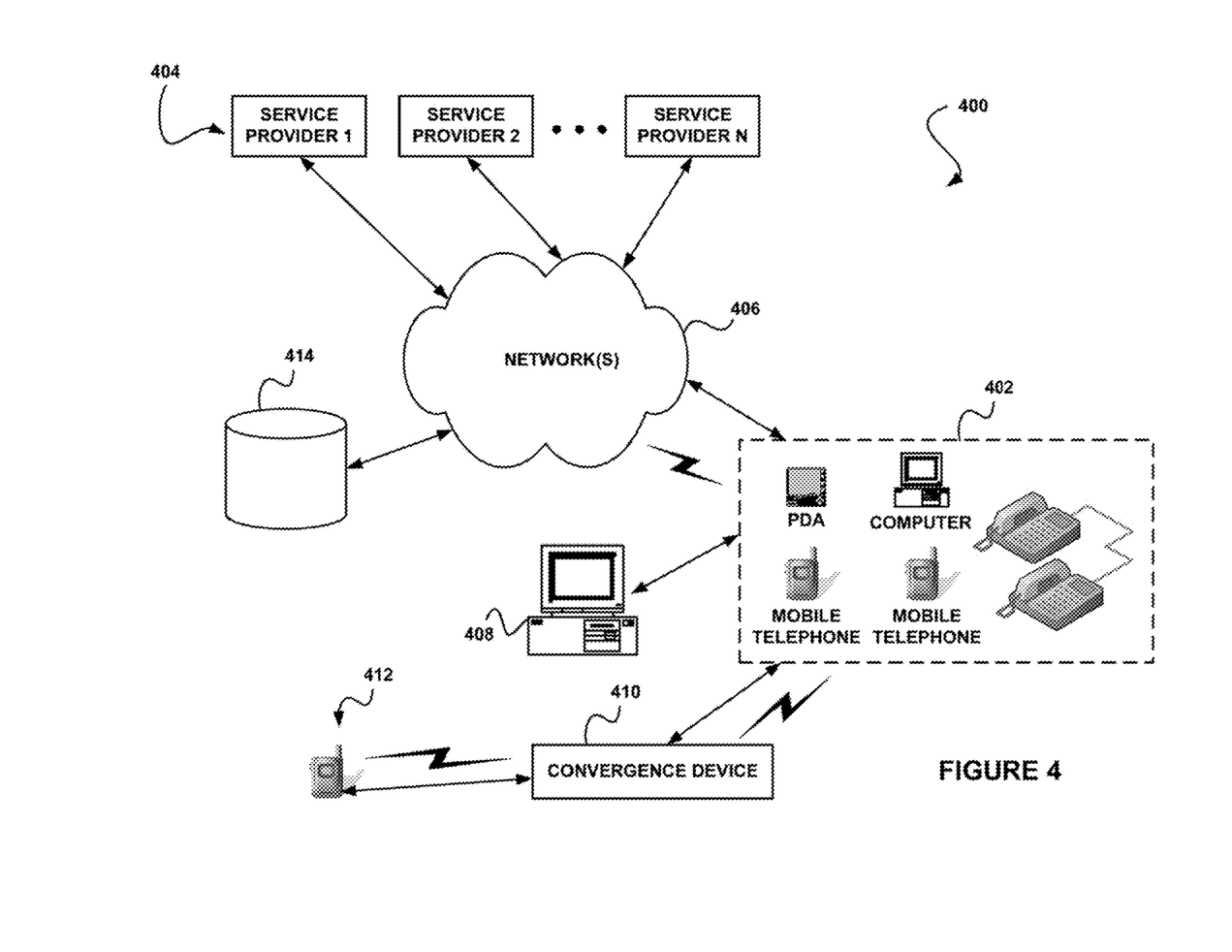
FIG. 4 shows a system for determining at least one recommended device from a plurality of devices for initiating a phone call based on a determined call rate, in accordance with one embodiment.

FIG. 4 shows a system 400 for determining at least one recommended device from a plurality of devices for initiating a phone call based on a determined call rate, in accordance with one embodiment. As an option, the system 400 may be implemented in the context of the details of FIGS. 1-3. Of course, however, the system 400 may be implemented in any desired environment. Further, the aforementioned definitions may equally apply to the description below.

As shown, a plurality of user devices 402 capable of initiating a phone call are provided. The user devices 402 may include any number of user devices and various types of user devices. For example, in various embodiments, the user devices may include PDAs, mobile telephones, landline telephones, computers, and/or any other device capable of initiating a phone call.

Each of the user devices 402 may be in communication with an associated service provider 404 over one or more networks 406. Additionally, in one embodiment, the user devices 402 may be in communication with a computer 408 (e.g. a server or client, etc.) including one or more computer programs for determining at least one recommended device from the plurality of user devices 402 for initiating a phone call based on a determined call rate. In another embodiment, the user devices 402 may include one or more computer programs for determining at least one recommended device from the plurality of user devices 402 for initiating a phone call based on a determined call rate.

In this way, the system 400 presents an automatic technique of selecting a phone, telephony device, or service provider to be used for making calls that will give the best price when using a convergence device 410. In the context of the present description, a convergence device refers to any device capable of providing unified access to a plurality of user devices having different phone subscriptions.

For example, households and businesses may have multiple service subscriptions and use multiple service providers. These subscriptions may be present because a certain service plan associated with a phone has a better rate for a set of services. Additionally, one subscription may be for business use and another subscription may be for personal use. Still yet, households and businesses may have call plans with one or more long distance and/or international carriers that give better rates for specific countries or for a specific time of day.

In order to allow a standard, unified access to all of these phones associated with different subscriptions, the convergence device 410 may be utilized to allow both wire line and mobile telephones to be accessed through a communication device 412 (e.g. a cordless phone, etc.). Using such a convergence device may allow a user (e.g. a subscriber, etc.) to choose which phone to use to make calls, thereby taking advantage of the free minutes available as part of the mobile phone plan and cheaper local phone rates for the wire line phone. In this case, the user may want to keep track of service usage and make the selection each time a call is made based on the service usage information.

Thus, a computer program and database may be utilized that will allow the details of the rate plans that the subscriber has from various providers to be stored and accessed. These details may include the free minutes/allowance, a minimum commitment and the rates for various types of calls (e.g. local calls to landline, local calls to a cell phone, friends and family call rates, etc.), and a bill cycle period in the case of a postpaid plan, and various other information. In one embodiment, a user may provide the details of any phone service/plan to be considered (e.g. when subscribing to a convergence service, a service plan tracking service, etc.).

In one embodiment, a user may also set preferences such as preferences to use a specific number (e.g. an office mobile device, etc.) for calls to a specific set of numbers or a specific type of calls (e.g. international calls, etc.). In another embodiment, rates may be charged by different long distance/international providers.

In operation, a user may attempt a phone call using the communication device 412. The converged device 410, or other device (e.g. a mobile phone, etc.) in case of international calls or when the best service provider should be selected, may connect to the computer 408 or other device including an application for determining the recommended device for initiating the phone call based on a call rate, with the details of the call (e.g. the called number, date and/or time information, etc.).

The rate that will be charged for the call may then be determined by the device hosting the application, taking into account some or all of the rating related information. The recommended phone and/or provider through which the call should be setup/initiated may be sent to the converged device 410. The converged device 410 may then initiate the call according to this recommendation. At the end of the call, the converged device 410 may send details of the call (e.g. duration, start and end time of the call, etc.) such that the computer 408 or a database 414 for storing the rating related information may be updated. This updating may include updating the computer 408 or the database 414 with a remaining minute allowance or other rating related information that may be used for selecting the best phone and/or provider for any subsequent calls.

It should be noted that, in various embodiments, the application for determining the recommended device based on the determined call rate may be located on a local computer, a mobile device, or on a remote server with access over the network 406. In this case, the network 406 may include a telecommunications network, a LAN, a wireless network, a WAN such as the Internet, peer-to-peer network, cable network, etc.

In one embodiment, a database of various common offers from different operators/providers may be provided. In this case, the subscriber may select the specific offer that they have subscribed to and provide specific information such as a bill cycle, friends and family numbers, and various other information.

Furthermore, in one embodiment, a mobile convergence device may provide connections to multiple mobile phones and may have the ability to select the best phone to make calls. Additionally, the mobile convergence device may have the ability to receive calls from any of those phones.

Figure 5A:
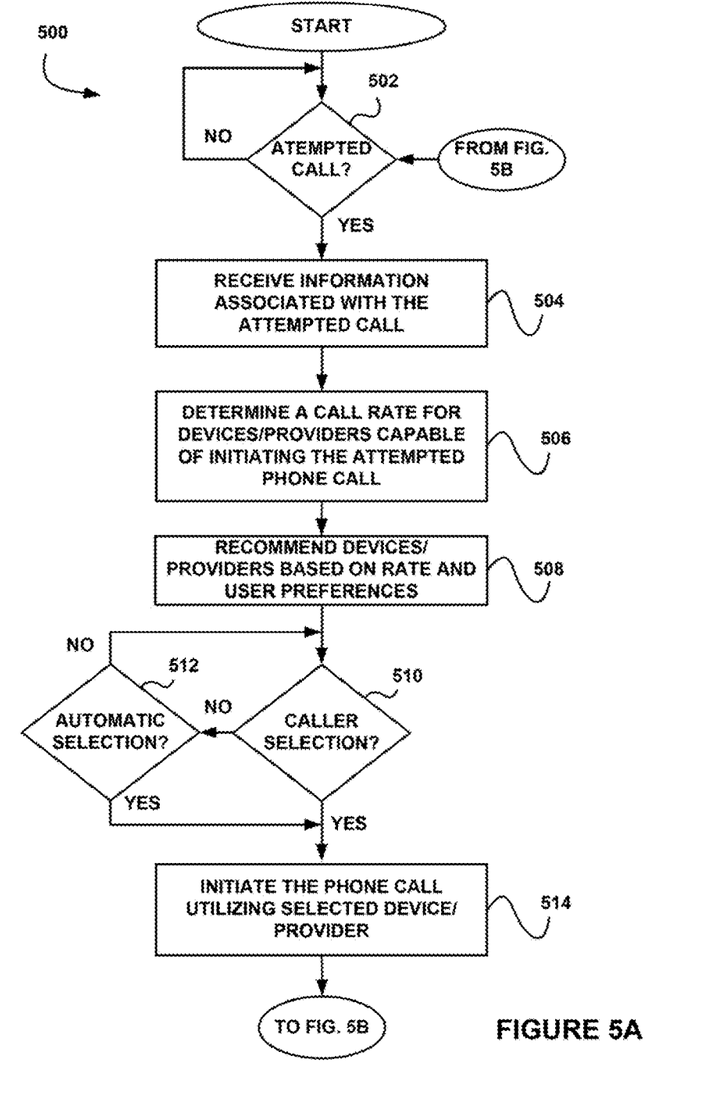
FIGS. 5A-5B show a method for determining at least one recommended device or provider from a plurality of devices or providers for initiating a phone call based on a determined call rate, in accordance with another embodiment.
Figure 5B:
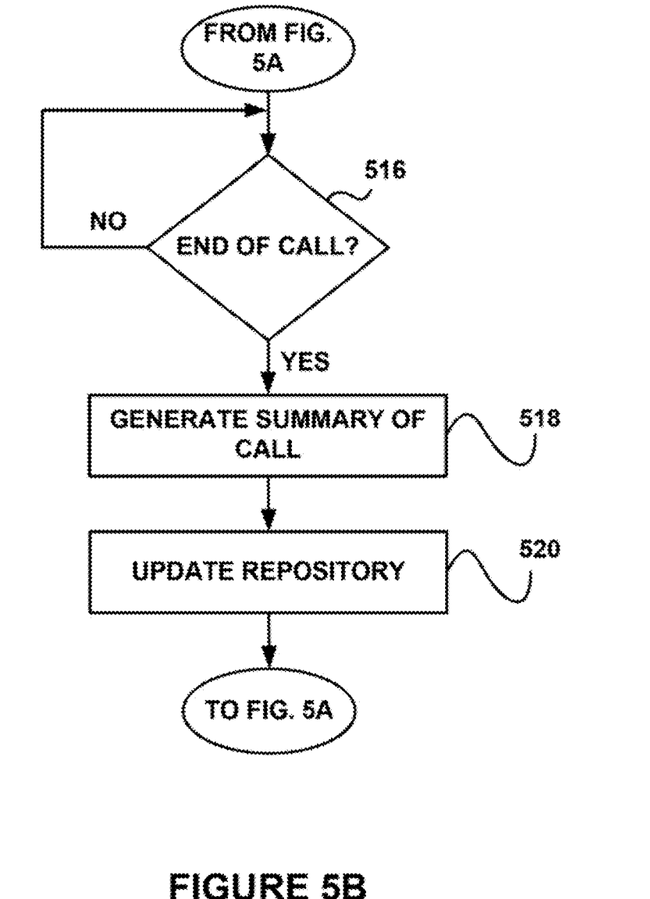

FIGS. 5A-5B show a method 500 for determining at least one recommended device or provider from a plurality of devices or providers for initiating a phone call based on a determined call rate, in accordance with another embodiment. As an option, the method 500 may be implemented in the context of the details of FIGS. 1-4. Of course, however, the method 500 may be carried out in any desired environment. Again, the aforementioned definitions may equally apply to the description below.

As shown, it is determined whether a phone call is attempted. See operation 502. In this case, the call may be attempted by a device associated with a converged device or a mobile phone.

If it is determined that a phone call has been attempted, information associated with the attempted call is received. See operation 504. The information may be received at any device implementing an application capable of determining a rate of a call (e.g. a converged device, a computer, a mobile phone, etc.).

Using this information, a call rate for a device or a service provider capable of initiating the attempted call is determined. See operation 506. Based on this rate and any user preferences, at least one device or provider is recommended. See operation 508.

For example, the recommended device may be based, at least in part, on user defined preferences. In this case, the user defined preferences may include a preferred device to use for initiating calls to one or more defined phone numbers, and a preferred device to use for initiating calls associated with a selected type of call.

In various embodiments, the recommend devices may be presented to a caller, or may be selected automatically. Additionally, there may be one device recommended, or many different devices recommended. In one embodiment, the recommend devices may be presented to the user. In this case, the user may have the option to select the devices.

As an option, the user may be presented with the options as part of a graphical user interface (GUI). In this case, the user may be presented with the options in a list form on a display of the device used to attempt the call. In another embodiment, the user may be presented with an audible list.

In still another embodiment, the user who attempted the phone call may also be presented with offers from one or more entities (e.g. service providers, advertisers, etc.). In this case, the user may have the option to select one or more of these offers. In the case that the offer is a rate plan, the user may be allowed to use this offered rate plan to initiate and complete the call.

If the caller is presented with the recommended devices or providers, it may be determined whether the caller has selected a device or a provider to initiate the phone call. See operation 510. As another option, the device to initiate the phone call may be automatically selected based on the rating related information.

The automatic selection may be made based on a best rate of a device and/or a provider. Accordingly, it is determined whether an automatic selection is made. See operation 512.

Once a selection is made, either manually or automatically, the phone call is initiated using the selected device or provider. See operation 514. As shown in FIG. 5B, it is determined whether the initiated call has ended. See operation 516.

If the call has ended, a summary of the call is generated. See operation 518. In one embodiment, the summary may be generated by a converged device.

The summary may include any information related to the phone call. For example, the summary may include a summary of minutes used. Furthermore, the summary may include a call start time and a call end time. Still yet, the summary may include a time of day, the free minutes used, the peak minutes used, and/or any other information.

This summary may then be utilized to update a repository. See operation 520. The repository may be any storage unit capable of storing rating related information and call data. This information in the repository may then be utilized for any subsequent calls.

For example, the rating related information may be stored in a database. The rating related information stored in the database may be updated upon completion of the phone call. This rating related information may then be used to rate any subsequent calls.

It should be noted that, in various embodiments, the database may be a local or remote database. For example, in one embodiment, the database may be a networked database accessible over one or more networks. In another embodiment, the database may be a local database associated with a local computer. In yet another embodiment, the database may include a storage unit of a mobile device.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
receiving information associated with an attempted phone call;
determining a call rate for a plurality of devices capable of initiating the attempted phone call, utilizing a processor, wherein the call rate is determined based on rating related information for each of the plurality of devices;
determining at least one recommended device of the plurality of devices for initiating the phone call based, at least in part, on the determined call rate and on user defined preferences including a preferred device to use for initiating calls to one or more defined phone numbers and a preferred device to use for initiating calls associated with a selected type of call; and
initiating the phone call utilizing one of the at least one recommended device;
wherein the rating related information is stored in a database, and the rating related information stored in the database is updated upon completion of the phone call.

2. The method of claim 1, wherein the received information includes at least one of a phone number associated with the attempted phone call, a date of the attempted phone call, a time of the attempted phone call, and a geographical location associated with the attempted phone call.

3. The method of claim 1, wherein the rating related information includes a number of available minutes for each of the plurality of devices.

4. The method of claim 1, wherein the rating related information includes a minimum commitment associated with each of the plurality of devices.

5. The method of claim 1, wherein the rating related information includes a rate for a type of call.

6. The method of claim 5, wherein the type of call includes calls between wireless devices.

7. The method of claim 5, wherein the type of call includes calls between wireless devices and landline devices.

8. The method of claim 1, wherein the rating related information includes a friends and family call rate.

9. The method of claim 1, wherein the rating related information includes a rate for different long distance or international carriers who can provide an associated service.

10. The method of claim 1, wherein the rating related information includes a bill cycle period associated with each of the plurality of devices.

11. The method of claim 1, further comprising presenting a user who attempted the phone call with offers from one or more entities.

12. The method of claim 1, wherein the plurality of devices include mobile phones.

13. The method of claim 1, wherein the plurality of devices are associated with one or more different service providers.

14. A computer program product embodied on a non-transitory computer readable medium, comprising:
computer code for receiving information associated with an attempted phone call;
computer code for determining a call rate for a plurality of devices capable of initiating the attempted phone call, wherein the call rate is determined based on rating related information for each of the plurality of devices;
computer code for determining at least one recommended device of the plurality of devices for initiating the phone call based, at least in part, on the determined call rate and on user defined preferences including a preferred device to use for initiating calls to one or more defined phone numbers and a preferred device to use for initiating calls associated with a selected type of call; and
computer code for initiating the phone call utilizing one of the at least one recommend device;
wherein the computer program product is operable such that the rating related information is stored in a database, and the rating related information stored in the database is updated upon completion of the phone call.

15. An apparatus, comprising:
an interface for receiving information associated with an attempted phone call; and
a processor for determining a call rate for a plurality of devices capable of initiating the attempted phone call based on rating related information for each of the plurality of devices, determining at least one recommended device of the plurality of devices for initiating the phone call based, at least in part, on the determined call rate and on user defined preferences including a preferred device to use for initiating calls to one or more defined phone numbers and a preferred device to use for initiating calls associated with a selected type of call, and for initiating the phone call utilizing one of the at least one recommend device;
wherein the apparatus is operable such that the rating related information is stored in a database, and the rating related information stored in the database is updated upon completion of the phone call.

16. The method of claim 1, wherein the updated rating information is used in determining the call rate for the plurality of devices upon receiving information associated with subsequent attempted phone calls.

17. The method of claim 1, wherein a plurality of devices is determined as recommended devices, and the plurality of devices determined as recommended devices are presented to a user for selection of one of the plurality of devices determined as recommended devices.

* * * * *